| United States Patent [19] | [11] 4,094,756 |
|---|---|
| Taylor | [45] * June 13, 1978 |

[54] PHOTOCHEMICAL MODIFICATION OF POLYMERS

[75] Inventor: Lynn J. Taylor, Toledo, Ohio

[73] Assignee: Owens-Illinois, Inc., Toledo, Ohio

[ * ] Notice: The portion of the term of this patent subsequent to Mar. 16, 1993, has been disclaimed.

[21] Appl. No.: 645,103

[22] Filed: Dec. 29, 1975

Related U.S. Application Data

[63] Continuation-in-part of Ser. No. 183,276, Sep. 23, 1971, abandoned.

[51] Int. Cl.² .............................. C08F 8/18; C08F 8/34
[52] U.S. Cl. .......................... 204/159.18; 204/159.14; 204/159.2; 260/23 H; 427/54; 526/14; 526/16; 526/19; 526/22; 526/27; 526/29; 526/30; 526/49; 526/54; 526/56; 526/57

[58] Field of Search ........... 204/159.2, 159.17, 159.18; 260/23 H, DIG. 21

[56] References Cited

U.S. PATENT DOCUMENTS 3,944,511  3/1976  Taylor .............................. 260/23 H

*Primary Examiner*—Richard B. Turer
*Attorney, Agent, or Firm*—Richard D. Heberling; Myron E. Click; David H. Wilson

[57] ABSTRACT

There is disclosed a process for preparing chemically modified olefin polymers or copolymers which comprises exposure to ultraviolet or visible radiation of a mixture containing a polymer, a sensitizer, and a co-reactant having a structure containing both a saturate aliphatic hydrocarbon residue and at least one highly polar functional group.

18 Claims, No Drawings

PHOTOCHEMICAL MODIFICATION OF POLYMERS

RELATED APPLICATION

This is a continuation-in-part of copending U.S. Pat. Application Ser. No. 183,276, filed Sept. 23, 1971, now abandoned. The benefit of 35 USC 120 is claimed.

BACKGROUND OF THE INVENTION

This invention relates to the preparation of novel polymeric materials by the chemical modification of polyolefins, olefin copolymers, and other polymeric materials with a structure containing saturated aliphatic carbon atoms. The resulting modified polymers are highly suitable for use in coating, adhesive, and packaging applications.

More particularly, this invention relates to the chemical combination of a polyolefin polymer or copolymer with one or more non-polymeric organic compounds having the generalized structure R-X, where R is a saturated linear, branched, or cyclic aliphatic hydrocarbon residue containing at least six carbon atoms, and X is a polar functional group which is a member of the series comprising the following groups:

Hydroxyl (—OH);
carboxyl (—COOH);
amide (—CONH$_2$);
mono- or disubstituted amide
(—CONHR$_1$ or —CONR$_1$R$_2$), where the substituents R$_1$ and R$_2$ are the same or different lower alkyls containing one to four carbons;
amino (-NH$_2$);
mono- or disubstituted amino
(—NHR$_1$ or —NR$_1$R$_2$), where the substituents R$_1$ and R$_2$ are the same or different lower alkyls containing one to four carbons;

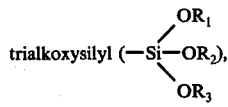

where the substituents R$_1$, R$_2$, and R$_3$ are lower alkyls containing one to four carbon atoms;
sulfonic acid (—SO$_3$H);
hydrogen sulfate (—OSO$_3$H);
and
dihydrogen phosphate (—OPO$_3$H$_2$).

The group X may also bear one or more units of positive or negative charge, as in the case of the following groups:

carboxylate (—COO$^\ominus$);
sulfonate (—SO$_3^\ominus$);
singly charged sulfate (—OSO$_3^\ominus$);
singly or doubly charged phosphate (—OPO$_3$H$^\ominus$ or —OPO$_3^\ominus$);
ammonium (—N$^\oplus$R$_1$R$_2$R$_3$); where the substituents R$_1$, R$_2$ and R$_3$ are hydrogens or lower alkyls containing one to six carbons;
sulfonium (—S$^\oplus$R$_1$R$_2$), where the substituents R$_1$ and R$_2$ are the same or different lower alkyls containing one to six carbons;
and
phosphonium (—P$^\oplus$R$_1$R$_2$R$_3$), where the substituents R$_1$, R$_2$ and R$_3$ are the same or different lower alkyls containing one to six carbon atoms.

In the case of such charged groups, it should be understood that an ion of opposite charge is simultaneously present, such as a sodium ion in the case of a carboxylate or sulfonate group, and a halide ion in the case of an ammonium, sulfonium, or phosphonium group.

It is further contemplated that the co-reactant R-X may contain heterocyclic rings as a part of the structure of R, in addition to the essential aliphatic hydrocarbon group or groups. Furthermore, it should be understood that more than one group of type R, and/or more than one group of type X, may be present per molecule of co-reactant R—X.

Many compounds of the type R—X as described hereinbefore, particularly those having a single group of type R and a single group of type X, are referred to as 'surfactants' owing to their surface-active properties.

This invention consists of effecting the chemical combination of the polymeric polyolefin reactant and the non-polymeric co-reactant (R—X), preferably in the presence of one or more sensitizing additives, to ultraviolet or visible radiation of appropriate wavelength.

The term 'sensitizer' is applied to reagents which are capable of absorbing ultraviolet and/or visible radiation and, following such photochemical excitation, of initiating or accelerating chemical reactions which lead to chemical combination of the polymer and co-reactant. Preferred additives are those which are known to initiate free-radical reactions, such as photopolymerization and photooxidation.

While the mechanism of the photosensitized chemical modification process is not presently understood in detail, it is believed that the excited state of the photosensitizer undergoes subsequent processes (such as unimolecular decomposition, hydrogen abstraction, or energy transfer) which lead directly or indirectly to the formation of free-radical intermediates. Free radicals derived from the polymer combine with other free radicals derived from the co-reactant, so that polar groups (X) derived from the co-reactant became chemically bonded to the polymer molecules.

The formation of crosslinked polymers by processes involving the formation and interaction of free-radical intermediates is known in the prior art. In such processes, a crosslink between polymer chains is formed as a result of the combination of polymeric radicals. Typically, this is accomplished by heating a mixture of a polymer and an organic peroxide to a temperature at which the peroxide decomposes to free radicals.

The formation of graft copolymers by free-radical processes is also known in the prior art. In such processes, a polymeric radical is formed, and undergoes an addition reaction with the reactive carbon-carbon double bond of a vinyl monomer, such as styrene or methyl methacrylate; the resulting radical then adds further units of vinyl monomer by successive radical addition reactions. Typically, such a graft copolymerization is accomplished by heating a mixture of a polymer, a vinyl monomer, and an organic peroxide to a temperature at which the peroxide decomposes to yield free radicals.

Likewise, the preparation of physical blends of polymers with certain types of non-polymeric additives of the type R—X is known in the prior art. Typically, such additives are employed so as to confer antistatic properties or to aid in the dispersion of particulate materials in polymers or polymer solutions.

The use of sensitizing additives which facilitate the initiation of certain types of free-radical reactions is also known in the prior art. For example, irradiation of a mixture of a vinyl monomer and a sensitizing additive is known to lead to photopolymerization.

In one preferred embodiment of this invention, a mixture of a thermoplastic olefin polymer or copolymer, a saturated fatty acid co-reactant, and a sensitizing additive is exposed to an artificial source of ultraviolet and/or visible radiation.

In the case of such preferred embodiment, examples of the polymeric reactant, fatty acid, and sensitizer are given hereinafter.

Examples of polymeric reactants include:
polyethylene;
polypropylene;
poly(1-butene);
poly(4-methyl-1-pentene);
ethylene-propylene copolymers;
ethylene-1-butene copolymers;
ethylene-1-hexene copolymers;
ethylene-vinyl acetate copolymers;
ethylene-ethyl acrylate copolymers;
ethylene-acrylic acid copolymers.
and
Examples of fatty acids include:
capric acid;
lauric acid;
stearic acid;
palmitic acid;
myristic acid;
Examples of suitable sensitizing additives include the following:

Ketones

Acetophenone
Acetoin
1-Acetonaphthone
2-Acetonaphthone
Anisoin
Anthrone
Bianthrone
Benzil
Benzoin
Benzoin Methyl Ether
Benzoin Isopropyl Ether
1-Decalone
2-Decalone
Benzophenone
p-Chlorobenzophenone
Dibenzalacetone
Benzoylacetone
Benzylacetone
Deoxybenzoin
2,4-Dimethylbenzophenone
2,5-Dimethylbenzophenone
3,4-Dimethylbenzophenone
4-Benzoylbiphenyl
Butyrophenone
9Fluorenone
4,4-Bis-(dimethylamino)-benzophenone
4-Dimethylaminobenzophenone
Dibenzyl Ketone
4-Methylbenzophenone
Propiophenone
Benzanthrone
1-Tetralone
2-Tetralone
Valerophenone
4-Nitrobenzophenone
Di-n-hexyl Ketone
Isophorone
Xanthone

Azo Compounds

2-Azo-bis-isobutyronitrile
2-Azo-bis-propionitrile
Dimethyl-2-azo-bis-isobutyrate
1-Azo-bis-1-cyclohexanecarbonitrile
2-Azo-bis-2-methylheptanitrile
2-Azo-bis-2-methylbutyronitrile
4-Azo-bis-4-cyanopentanoic Acid
Azodicarbonamide
Azobenzene
'Azo Dyes'

Hydroperoxides tert-Butyl Hydroperoxide
Cumene Hydroperoxide
Diisopropylbenzene Hydroperoxide
2,5Dimethylhexane-2,5-dihydroperoxide
p-Menthane Hydroperoxide
1,1,3,3-Tetramethylbutyl Hydroperoxide

Peroxides

Acetyl Peroxide
Benzoyl Peroxide
p-Chlorobenzoyl Peroxide
2,4Dichlorobenzoyl Peroxide
Ditoluoyl Peroxide
Decanoyl Peroxide
Lauroyl Peroxide
Isobutyryl Peroxide
Diisononanoyl Peroxide
Pelargonyl Peroxide
tert-Butyl Peroxyacetate
tert-Butyl Peroxymaleic Acid
tert-Butyl Peroxyisobutyrate
tert-Butyl Peroxypivalate
tert-Butyl Peroxybenzoate
tert-Butyl Peroxycrotonate
tert-Butyl Peroxy-(2ethylhexanoate)
2,5-Dimethyl-2,5-bis-(2-ethylhexanoylperoxy)hexane
2,5-Dimethyl-2,5-bis-(benzoylperoxy)hexane
2,5-Dimethyl-2,5-bis-(tert-butylperoxy)hexane
2,5-Dimethyl-2,5-bis-(tert-butylperoxy)-hexane-3
Di-tert-butyl Diperoxyphthalate
1,1,3,3Tetramethylbutylperoxy-2ethyl-hexanoate
Di-tert-butyl Peroxide
Di-tert-amyl Peroxide
tert-Amyl-tert-butyl Peroxide
1,1-tert-butylperoxy-3,3,5-trimethyl Cyclohexane
Bis-(tert-butylperoxy)-diisopropylbenzene
n-Butyl-4,4bis-(tert-butylperoxy)valerate
Dicumyl Peroxide
Acetyl Acetone Peroxide
Methyl Ethyl ketone Peroxide
Cyclohexanone Peroxide
tert-Butylperoxy Isopropyl Carbonate
2,2Bis-(tert-butylperoxy)butane
Di-(2-ethylhexyl)peroxydicarbonate
Bis-(4tert-butylcyclohexyl)peroxydicarbonate

Quinones

Anthraquinone
1-Aminoanthraquinone
2-Aminoanthraquinone
1-Chloroanthraquinone

2-Chloroanthraquinone
1Methylanthraquinone
2-Methylanthraquinone
1-Nitroanthraquinone
2-Phenylanthraquinone
1,2-Naphthoquinone
1,4-Naphthoquinone
2-Methyl-1,4-Naphthoquinone
1,2-Benzanthraquinone
2,3-Benzanthraquinone
Phenanthrenequinone
'Anthraquinone Dyes'

Organic Sulfur Compounds

Diphenyl Disulfide
Dibenzyl Disulfide
Dibenzoyl Disulfide
Dilauroyl Disulfide
1-Naphthalenethiol
Diisopropylbenzene Thiol
2-Mercaptobenzothiazole
2-Mercaptobenzimidazole
Tetramethylthiuram Monosulfide
Tetramethylthiuram Disulfide
Ethyl-2-benzothiazylsulfonate
p-Toluenesulfonyl Chloride Organic Halogen Compounds Chlorinated Paraffins
Chlorinated Biphenyls and Polyphenyls
Chlorinated Toluenes, Xylenes, etc.
Benzyl Chloride
3,4-Dimethylbenzyl Chloride
Benzyhydryl chloride
Benzal Chloride
Benzotrichloride
Chlorinated Naphthalenes
1-Chloromethylnaphthalene
Tetrachlorotetrahydronaphthalene
Phenacyl Chloride
Phenacyl Bromide
Styrene Dibromide Metallo-organic Reagents Cobalt 2ethylhexanoate
Cobalt naphthenate
Cobalt tallate
Copper naphthenate Copper phthalocyanine
Copper acetylacetonate
Ferric acetylacetonate
Ferrous acetylacetonate
Ferrous stearate
Iron neodecanoate
Iron tallate
Manganese naphthenate
Manganese tallate In the aforementioned specific embodiment, the saturated fatty acid may be replaced by another suitable co-reactant of the general type R—X. Suitable co-reactants would include alcohols such as lauryl alcohol, stearyl alcohol, cetyl alcohol, and amines such as lauryl dimethyl amine, stearyl dimethyl amine, and stearyl amine; and amine oxides such as lauryl dimethyl amine oxide, stearyl dimethyl amine oxide, and cetyl dimethyl amine oxide; fatty acid amides such as lauric acid diethanolamide, stearic acid diethanolamide, lauric acid N, N-dimethyl amide, and stearic acid N, N-dimethyl amide; and dicarboxylic acids and salts such as sebacic acid, azelaic acid, and sodium sebacate.

In the aforementioned specific embodiment, the saturated fatty acid may be replaced by a nonionic, anionic, or cationic surfactant.

Examples of nonionic surfactants include:
mono and di glycerides, e.g. monostearin, distearin, and
polyethylene glycol and derivatives, including saturated fatty acid esters (mono and di).

Examples of cationic surfactants include:
lauryl trimethyl ammonium chloride;
lauryl pyridinium chloride;
cetyl trimethyl ammonium bromide;
cetyl pyridinium bromide;
cetyl pyridinium chloride;
cetyl dimethyl benzyl ammonium chloride;
stearyl dimethyl benzyl ammonium chloride;
and
dilauryldimethyl ammonium bromide.

Examples of anionic surfactants include:
sodium laurate;
sodium stearate;
sodium lauryl sulfate;
sodium dioctyl sulfosuccinate;
sodium dinonyl sulfosuccinate;
and
lauryl acid phosphate.

An important feature of many photosensitized processes, including those described here, is that no chemical changes take place in the absence of light. Thus a mixture of a thermoplastic polymer, co-reactant, and sensitizer has substantially the same thermal stability as the polymer alone. Consequently, it is highly convenient to prepare such a mixture, to shape it by one or more methods known to the plastics and coating art, (such as extrusion, molding, calendaring, casting, etc.) and subsequently to conduct the reaction in situ by exposure of the resulting shaped article or coating to a source of ultraviolet or visible radiation.

In one highly preferred embodiment, a coating composition containing an olefin polymer or copolymer, a suitable co-reactant, and a sensitizer, optionally containing at least one volatile solvent, is applied to the surface of a glass container, allowed to dry, and subsequently 'cured' in situ by ultraviolet or visible radiation to afford an adherent coating which protects the glass substrate from damage.

In either or both of the preceding embodiments, a mixture of two or more co-reactants of type R—X, or of two or more sensitizing additives, may be employed.

In the practice of this invention it is contemplated that the reactive composition will ordinarily contain about 70-98% by weight of the polymer or copolymer, 1-20% of the co-reactant, and 1-10% of the sensitizing additive(s). In certain cases, the presence of sensitizing groups in the polymer or co-reactant, or the use of radiation of specific wavelengths, will make it possible to omit the sensitizing additives entirely.

Additional materials, such as fillers, pigments, dyes, plasticizers, foaming agents, reinforcing agents, etc., may also be present during the reaction, or may be added subsequently. It should be understood that such additives are not to be considered in calculating the percentages of polymer, co-reactant, and sensitizer, as specified above.

In comparison to the starting polymers, the modified polymers prepared in accordance with this invention have a number of useful properties. Such properties include increased susceptibility to environmental deterioration; increased susceptibility to microbiological attack ('biodegradability'); improved adhesion to surfaces such as metal, glass and wood; improved receptivity to dyes, inks, and coatings; improved wetting of fillers, reinforcing agents, and pigments; anti-static properties; improved emulsifiability; and improved solubility in certain solvents.

Such properties suggest a wide variety of practical applications, in such areas as coatings, adhesives, packaging films, inks, plastic cups and bottles, etc.

I claim:

1. A process for preparing chemically modified polyolefins or olefin copolymers which comprises exposing to ultraviolet or visible radiation an intimately dispersed mixture containing a polyolefin or olefin copolymer, an organic sensitizer, and an organic co-reactant having a structure containing both a saturated aliphatic hydrocarbon residue and at least one highly polar functional group, said co-reactant being a non-polymeric organic compound having the generalized structure R—X, where R is a saturated linear, branched, or cyclic aliphatic hydrocarbon residue containing at least six carbon atoms, and X is at least one polar functional group selected from the group consisting of hydroxyl (—OH); carboxyl (—COOH); amide (—CONH$_2$); mono- and disubstituted amide (—CONHR$_1$ and —CONR$_1$R$_2$), where R$_1$ and R$_2$ are the same or different lower alkyls containing one to four carbons; amino (—NH$_2$); mono- and disubstituted amino (—NHR$_1$ and NR$_1$R$_2$), where R$_1$ and R$_2$ are the same or different lower alkyls containing one to four carbons;

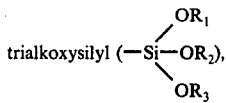

trialkoxysilyl (—Si—OR$_2$), where R$_1$, R$_2$ and R$_3$ are lower alkyls containing one to four carbons; sulfonic acid (—SO$_3$H); hydrogen sulfate (—OSO$_3$H); dihydrogen phosphate (—OPO$_3$H$_2$); carboxylate (—COO$^\ominus$); sulfonate (—SO$_3^\ominus$): singly charged sulfate (—OSO$_3^\ominus$); singly and doubly charged phosphate (—OPO$_3$H$^\ominus$ and OPO$_3^\ominus$); ammonium (—N$^\oplus$R$_1$R$_2$R$_3$), where R$_1$, R$_2$ and R$_3$ are hydrogens or lower alkyls containing one to six carbons; sulfonium (—S$^\oplus$R$_1$R$_2$), where R$_1$ and R$_2$ are the same or different lower alkyls containing one to six carbons; and phosphonium (—P$^\oplus$R$_1$R$_2$R$_3$), where R$_1$, R$_2$ and R$_3$ are the same or different lower alkyls containing one to six carbons.

2. The process of claim 1 wherein the co-reactant is a nonionic, anionic, or cationic surfactant.

3. The process of claim 1 wherein the co-reactant is a saturated fatty acid or saturated fatty acid amide.

4. The process of claim 1 wherein the co-reactant is selected from saturated aliphatic dicarboxylic acid, or salts thereof.

5. The process of claim 1 wherein there is reacted a polyolefin selected from polyethylene, polypropylene, poly(1-butene), and poly (4-methyl-1-pentene).

6. The process of claim 1 wherein there is reacted an olefin copolymer selected from ethylene-propylene copolymers, ethylene-1-butene copolymers, ethylene-1-hexene copolymers, ethylene-vinyl acetate copolymers, ethylene-ethyl acrylate copolymers, and ethylene-acrylic acid copolymers.

7. The process of claim 1 wherein the co-reactant is a saturated alcohol, amine, or amine oxide.

8. The process of claim 1 wherein the sensitizer is an aliphatic, aromatic, or alicyclic ketone.

9. The process of claim 1 wherein the sensitizer is an organic peroxide, peroxyester or hydroperoxide.

10. The process of claim 1 wherein the sensitizer is a quinone.

11. The process of claim 1 wherein the sensitizer is an organic sulfur compound.

12. The process of claim 1 wherein the sensitizer is an organic hlaogen compound.

13. The process of claim 1 wherein the sensitizer is a metallo organic compound.

14. The process of claim 1 wherein the reaction is conducted in situ on a substrate.

15. The process of claim 1 wherein a mixture of the polymer or co-polymer, co-reactant, and sensitizer is formed into a suitable geometric shape and the reaction conducted in situ while maintaining such geometric shape.

16. The process of claim 1 wherein said co-reactant is selected from the group consisting of nonionic surfactants, anionic surfactants, cationic surfactants, saturated fatty acids, saturated fatty acid amides, saturated aliphatic dicarboxylic acids, salts of saturated aliphatic dicarboxylic acids, saturated alcohols, amines and amine oxides.

17. The process of claim 1 wherein said mixture comprises about 70 to 98% by weight of said polyolefin or olefin copolymer, about 1 to 20% by weight of said co-reactant and about 1 to 10% by weight of said sensitizer.

18. A chemically modified polyolefin or olefin copolymer produced in accordance with the process of claim 1.

* * * * *

UNITED STATES PATENT AND TRADEMARK OFFICE
CERTIFICATE OF CORRECTION

PATENT NO. : 4,094,756
DATED : June 13, 1978
INVENTOR(S) : Lynn J. Taylor

It is certified that error appears in the above-identified patent and that said Letters Patent are hereby corrected as shown below:

Column 3, line 58, "9Fluorenone" should be —9-Fluorenone—.

Column 4, line 48, "1,1,3,3Tetramethylbutylperoxy-2-ethyl-hexanoate" should be —1,1,3,3-Tetramethylbutylperoxy-2-ethyl-hexanoate—.

Column 4, line 54, "n-Butyl-4,4bis-(tert-butylperoxy)valerate" should be —n-Butyl-4,4-bis-(tert-butylperoxy)valerate—.

Column 4, line 52, "1,1-tert-butylperoxy-3,3,5-trimethyl Cyclohexane" should be -1,1-Di-tert-butylperoxy-3,3,5-trimethyl Cyclohexane—.

Column 4, line 60, "2,2Bis-(tert-butylperoxy)butane" should be —2,2-Bis-(tert-butylperoxy)butane—.

Column 4, line 62, "Bis-(4tert-butylcyclohexyl)peroxydicarbonate" should be —Bis-(4-tert-butylcyclohexyl)peroxydicarbonate—.

Column 5, line 46, "Cobalt 2ethylhexanoate" should be —Cobalt 2-ethyl-hexanoate—.

Column 5, line 49, Copper naphthenate and Copper phthalocyanine should be on separate lines.

Signed and Sealed this

Twelfth Day of December 1978

[SEAL]

Attest:

RUTH C. MASON
Attesting Officer

DONALD W. BANNER
Commissioner of Patents and Trademarks